US011366794B1

(12) United States Patent
Saxena (10) Patent No.: US 11,366,794 B1
(45) Date of Patent: Jun. 21, 2022

(54) DATA STORE ITEM COUNT SERVICE

(71) Applicant: Amazon Technologies, Inc., Seattle, WA (US)

(72) Inventor: Shalabh Saxena, Monona, WI (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 15/601,830

(22) Filed: May 22, 2017

(51) Int. Cl.
| | |
|---|---|
| *G06F 16/22* | (2019.01) |
| *G06F 16/23* | (2019.01) |
| *G06F 16/90* | (2019.01) |
| G06F 16/28 | (2019.01) |
| G06F 16/955 | (2019.01) |

(52) U.S. Cl.
CPC .......... *G06F 16/2228* (2019.01); *G06F 16/22* (2019.01); *G06F 16/2379* (2019.01); *G06F 16/285* (2019.01); *G06F 16/90* (2019.01); *G06F 16/955* (2019.01)

(58) Field of Classification Search
CPC .. G06F 16/2228; G06F 16/22; G06F 16/2379; G06F 16/285; G06F 16/955; G06F 16/90
USPC .................................................. 707/600–899
See application file for complete search history.

(56) References Cited

U.S. PATENT DOCUMENTS

| | | | | |
|---|---|---|---|---|
| 2007/0005410 | A1* | 1/2007 | Kasravi | G06Q 10/06316 719/318 |
| 2008/0275840 | A1* | 11/2008 | Burger | G06F 16/2462 |
| 2010/0309911 | A1* | 12/2010 | Eshwar | H04L 12/1859 370/390 |
| 2012/0330954 | A1* | 12/2012 | Sivasubramanian | G06F 9/5061 707/737 |
| 2013/0031086 | A1* | 1/2013 | Strelec | G06F 16/2465 707/722 |
| 2015/0149405 | A1* | 5/2015 | Pathak | G06F 16/2358 707/609 |
| 2017/0244518 | A1* | 8/2017 | Singh | H04L 1/0061 |
| 2018/0150544 | A1* | 5/2018 | Bensberg | G06F 16/2365 |
| 2018/0307717 | A1* | 10/2018 | Moysi | G06F 16/235 |

(Continued)

OTHER PUBLICATIONS

"Turn Up the Volume With High-Speed Counters", MemSQL Blog, Retrieved from URL: http://blog.memsql.com/highspeedcounters/ on May 19, 2017, pp. 1-6.

*Primary Examiner* — Irete F Ehichioya
*Assistant Examiner* — Xiaoqin Hu
(74) *Attorney, Agent, or Firm* — Robert C. Koweït; Kowert, Hood, Munyon, Rankin & Goetzel, P.C.

(57) ABSTRACT

A data store item count process determines the number of items in a data store (e.g., the number of items in a database table). In response to receipt of triggering events (e.g., additions or deletions of items in a table), a function registered to process the events is launched. The function processes the events to identify a net change to a count of items, and updates a value in a data store based on the net change. Multiple functions may process events for respective sets of partitions of a table, or for respective sets of tables, and update a distinct count value for each partition or table. In some instances, the process is performed within the context of a serverless compute environment; the function (Continued)

may retire, without saving an execution state for the function. A reporting function may access the value and send the value to a metrics reporting service.

20 Claims, 7 Drawing Sheets

(56) References Cited

U.S. PATENT DOCUMENTS

2018/0314619 A1\* 11/2018 Jagadeesan ......... G06F 11/3608

\* cited by examiner

DATA STORE ITEM COUNT SERVICE

BACKGROUND

Some storage systems (e.g., databases or other types of data stores) do not track some characteristics about the items stored in the storage system. For example, a non-relational database service may not keep track of how many items are in a table or partition of a table as items are added to or deleted from the table.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of systems and processes that implement a technique for tracking information about the number of items in a data store are disclosed (e.g., an item in a table of a database, although other types of data stores are also contemplated). In some embodiments, the information about the number of items in the data store may be provided in real-time or in near-real-time with changes to the data store.

In some embodiments disclosed herein, a technique for tracking information about the number of items in a data store may include receiving events indicating additions or deletions of items in the data store, processing the events to identify a net change to a count of items in the table, and performing an update to an item count value in the data store based on the net change.

In various embodiments, the events may be transported from the data store service that processes the events by and/or received via data stream. In some instances, the number of events in the data stream or a time-based threshold may trigger processing of the events. For example, the trigger may cause a processing function to launch in a container of an event-driven computing service and to process the events to identify the net change. In some embodiments, the update to the item count value may be performed such that concurrent attempts to update the item count value do not cause error (e.g., no other process changed the item count value while it was being updated as described herein). For instance, the update may be performed as an atomic update or as a conditional write, although other techniques may be implemented without departing from the scope of this disclosure.

At least some of the functions disclosed herein may run or be executed in a network-based, multitenant, event-driven computer service, in embodiments. The tracking may be of items in a table stored at a network-based, multi-tenant, non-relational database service, in embodiments. For instance, one or more components of a computer system may be configured to trigger, via an event driven computing service, execution of a processing function in response to some number (e.g., a particular batch size) of create, update and/or delete events received in a data stream from a non-relational database service that processes events.

In some embodiments, a reporting function may gather item count values from a data store, process them (e.g., aggregate, format or the like) and provide the processed item count values to a metrics service (e.g., as the values or as a metric). The metrics service may process the values (e.g., into graphs or generate an alarm based on some characteristic of the values) and/or provide the values to clients of the service provider or to administrators of the service, in embodiments.

The relationships between the data stores being tracked, the data streams delivering the events and the processing functions processing the events may vary. For example, a table may include multiple partitions, and multiple processing functions may each process events for respective sets of the partitions. In some embodiments, two distinct processing functions may attempt update the same count value (e.g., a value for a partition or table). If both of the functions attempt update the same count value at the same time, a collision, error, or other undesirable outcome may occur. In some embodiments, the update to the item count value may be performed such that concurrent attempts to update the item count value do not cause error (e.g., no other process changed the item count value while it was being updated as described herein). For instance, the update may be performed as an atomic update or as a conditional write, although other techniques may be implemented without departing from the scope of this disclosure.

In some embodiments, the same processing function may process events for multiple data stores (e.g., multiple database tables) and update different count values for each table.

Figure 4:
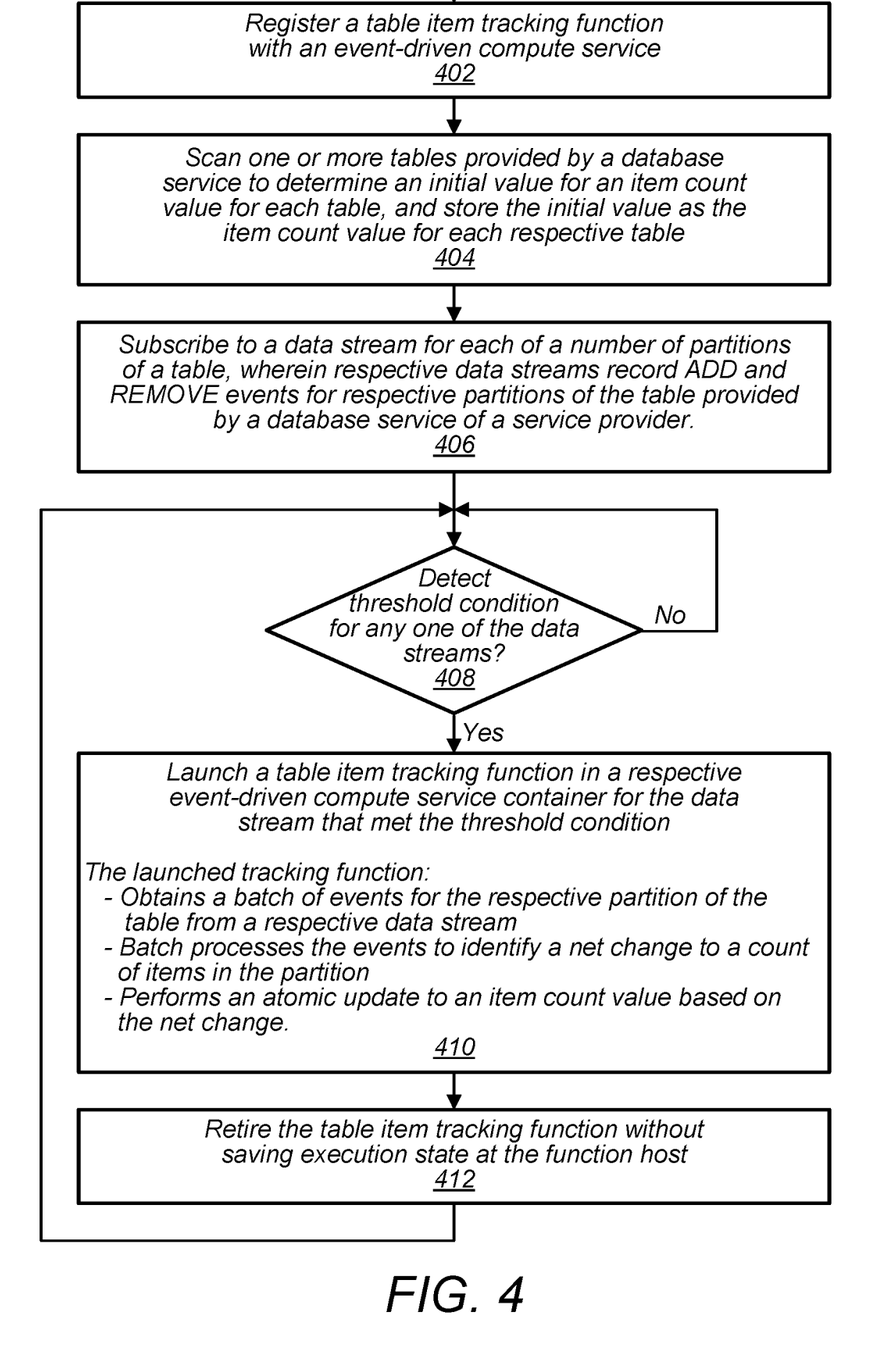
FIG. 4 illustrates a process diagram that depict a particular technique for tracking a count of a number of items in a database, according to at least some embodiments.
Figure 5:
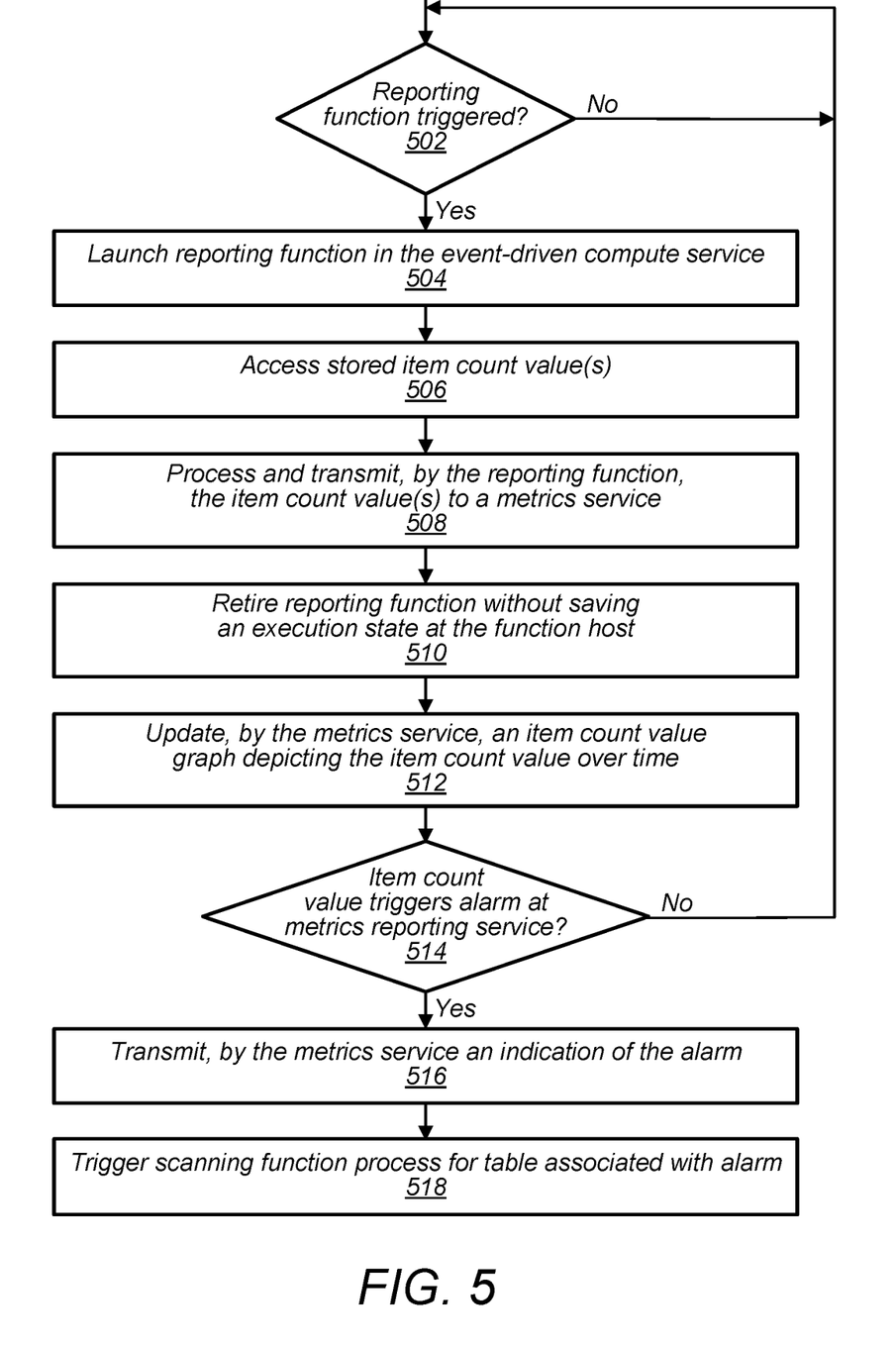
FIG. 5 is a process diagram that illustrates a technique for reporting the count of the number of items in a database, according to at least some embodiments.

In the following detailed description, FIGS. 1, 3, 6 and 7 illustrate block diagrams of various embodiments of example data store item count system (e.g., 212) that provides data store item count services, according to at least some embodiments. FIGS. 2, 4, and 5 illustrate processes that may be performed by one or more components of the services illustrated in the block diagrams. In some embodiments, other components (not necessarily illustrated) may perform some portion of the depicted processes, and more or fewer steps of the illustrated processes may be performed without departing from the scope of the disclosure.

Figure 1:
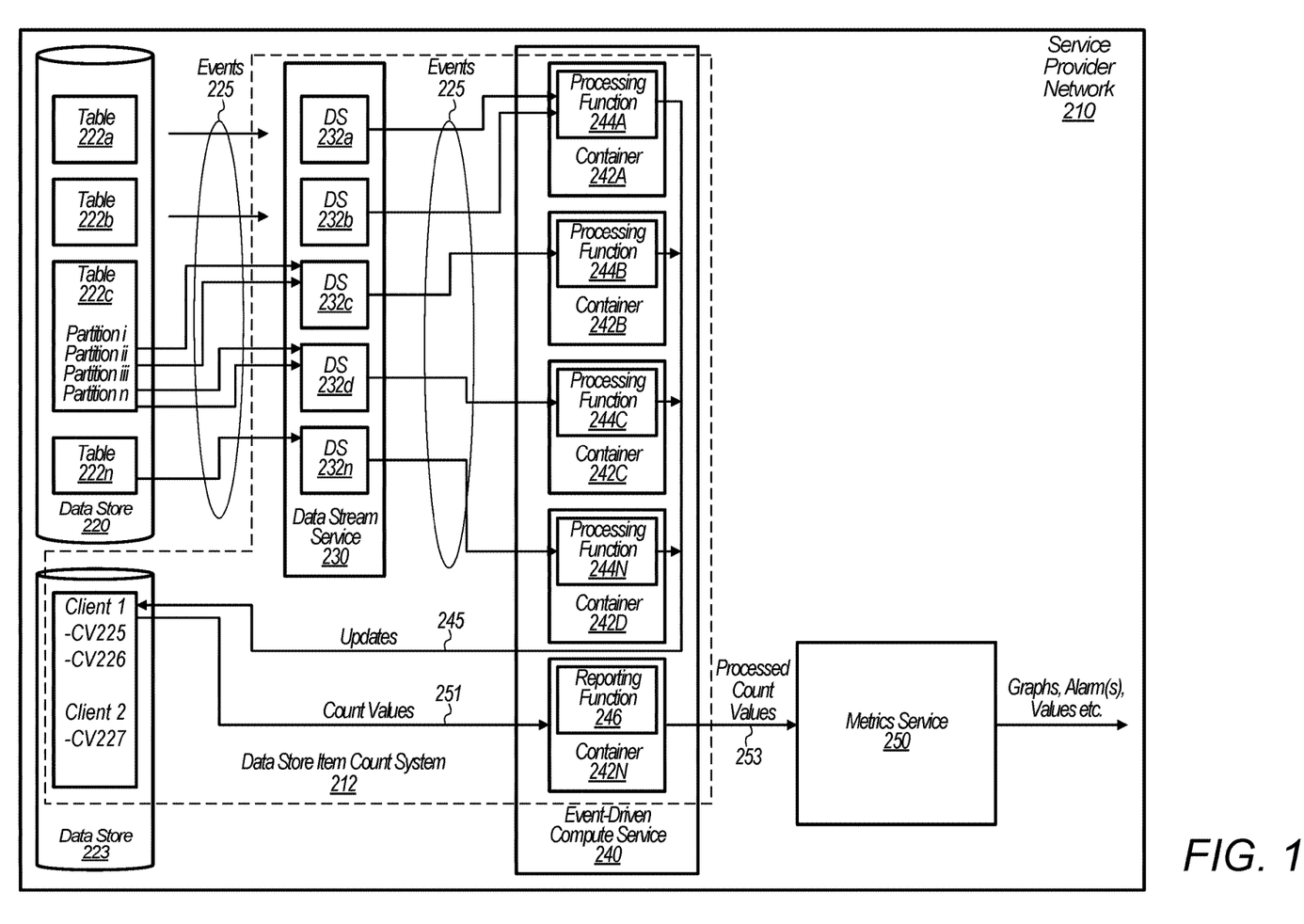
FIG. 1 depicts a data flow through an example architecture for implementing a technique for tracking a count of a number of items in a data store, where the architecture includes an event-driven compute service, according to at least some embodiments.
Figure 2:
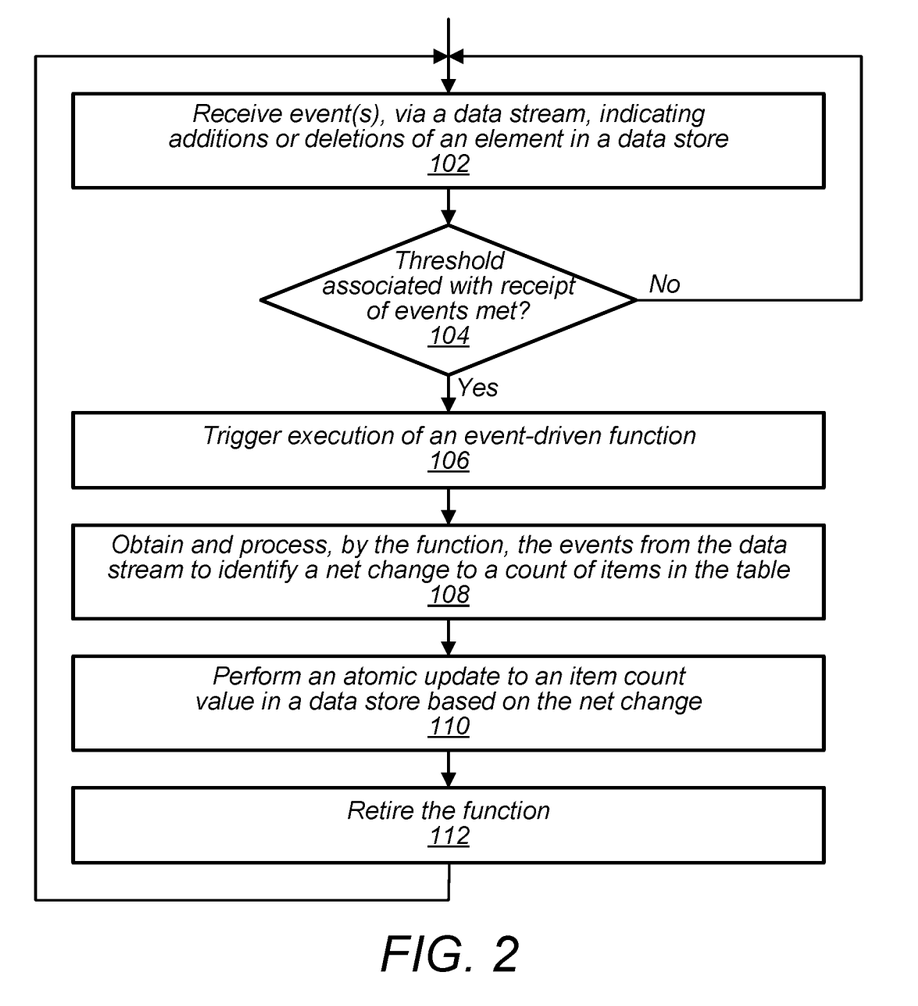
FIG. 2 depicts technique for tracking a count of a number of items in a data store, according to at least some embodiments.

FIG. 1 depicts a data flow through an example architecture for implementing a technique for tracking a count of a number of items in a data store, where the architecture includes an event-driven compute service, according to at least some embodiments. Service provider 210 in FIG. 1 may be implemented as part of various types of computer systems, such as an enterprise system or as a service provider to a number of distinct clients with respective client networks (e.g., illustrated in FIG. 6).

Service provider network 210 is depicted with data store 220 that includes tables 222a-d. Although depicted as a single data store 220 in the illustration, systems may include other types of data stores and numerous distinct data stores, in embodiments. Data store 220 may comprise any type of data store (a non-exhaustive list of store types includes file-based data stores, object-oriented databases, distributed data stores, etc.) without departing from the scope of this disclosure. Disclosed embodiments may include any of various types of data stores that may include various types of digital components, various characteristics of which may be tracked, for instance, a count of the number of items in a table of a database may be tracked, as described herein. However, other characteristics of other types of structures in a data store may also be tracked using the techniques described herein.

In at least the illustrated embodiment, events 225 (e.g., create, update, delete events in tables 222a-n of data store 220) are ingested into data streams 232a-n of a data stream service 230. The event driven compute service 240 may be configured to subscribe to or register to receive a particular database table or to a particular partition of the database table to or multiple distinct tables (e.g., via a data stream), in embodiments. Data streams 232 collect the events 225 that are subsequently obtained from the data streams and processed by processing functions 244A-N when the processing functions are triggered (e.g., triggered as described in block 104 in FIG. 2), in embodiments. The event-driven compute service 240 may monitor the stream for events and trigger launch of an associated function, in embodiments. Any of various triggers may be implemented, such as count-based triggers (e.g., how many events have been collected by the data stream) or time-based triggers (processing every-so-often or periodically). Some embodiments may use various stream listeners, to monitor data streams, for example.

Within the context of the service provider 210 in FIG. 1, events 225 delivered via data stream service 230 may be collected into batches by the processing function. In the illustrated example, the data store item count service 210 may batch process the events (e.g., events 225 from the data store that have entered or have been ingested into the data stream 232) by registering a processing function (e.g., 244) with the event-driven compute service (e.g., 240), and the event-driven compute service may launch the processing function in response to determining that a threshold has been reached within the data stream. In some instances, the threshold is a time threshold since the last batch was obtained from the data stream, or a quantity threshold of events present in the data stream, for example.

FIG. 2 depicts technique for tracking a count of a number of items in a data store, according to at least some embodiments. Although the process depicted in FIG. 2 is described within the context of the components of the provider network 210 in FIG. 1, various portions of the technique may be implemented via various combinations of components in any of numerous system architectures, examples of which are illustrated in FIGS. 1, 3, 6 and 7. Steps of the technique for tracking a count of a number of items in a data store illustrated in FIG. 2 may be combined with the steps depicted in FIGS. 4 and 5, in embodiments. Various steps may be omitted, in embodiments.

In at least the embodiment depicted in FIG. 2, one or more events are received via a data stream (block 102). The event(s) indicate additions or deletions of element(s) of a data store. For example, the events may include some combination of create, update and/or delete events (e.g., or other types of events) that cause changes to the number of items in a table or to other elements of a database or to other types of data stores. A determination of whether a threshold associated with receipt of the event(s) has been met is made (block 104). For instance, execution of an event-driven function is triggered in response to receiving events via a data stream (block 106). The trigger may be based upon an indication that the data stream has reached some threshold number of events, based upon a time threshold, or some combination thereof, for example. For instance, the function may be configured to trigger based on receiving an indication that the data stream has collected some particular number of events (e.g., a certain batch size), but at least every so often (e.g., 30 seconds, two minutes, once-a-day, etc.). The function (e.g., processing function 242A) may launch within a container of an event driven compute service (e.g., 240).

In embodiments, the function obtains and processes the events from the data stream to identify a net change to a count of elements in the data store (block 108). In embodiments, the function may receive a single event or a few events to process (for example, to provide something close to a real-time table item count with respect to changes to the table) or may receive events in larger batches. The function may determine a net change, in embodiments.

In some embodiments, a separate count for some characteristic of the data store (e.g., create, read, update and/or delete events, etc.) may be tracked. The separate values may be combined into various aggregations of count values and processed as an update, in embodiments. For instance, a count of deletion events across a number of tables for one client may be tracked and reported. A count of read create events for a single partition of a multi-partition table may be tracked and reported, in embodiments. Any of Various characteristics of the tables of a particular client may be tracked (e.g., for the lifetime of the table, daily, weekly, etc.), for example.

An atomic update is performed to an item count value in a data store based on the net change (block 110) in embodiments. Although an atomic may not be necessary in all architectures, in at least some embodiments, an atomic update is performed to increase the likelihood of validity of the item count value. For instance, when multiple processing functions (e.g., 244B, 244C) each process events for a table (e.g., table 222c) the distinct functions may each attempt to update the same item count value. An atomic update (e.g., a conditional update or some other type of concurrency control) increases the likelihood that simultaneous attempts to update the same item count value do not cause the item count value to become invalid. A processing function may update the item count value in the same table for which events are being processed and the item count value is tracked, or may update the item count value in a distinct data store (e.g., 223), such as a table intended to store item count values for a number of other distinct tables.

The function is retired (block 112) in embodiments. For example, the statelessness of an event-driven compute service may cause the function to be retired without saving an execution state at the host hosting the executing function. FIG. 2 illustrates that the process may iterate, going back to receipt of the events at 102 and continuing on through 104, etc.

In some embodiments, the technique may include triggering, based at least in part on an alarm from a metrics reporting service, a validation technique for validating the current value for the item count value. Determining the alarm may include identifying a negative value for the current item count value, or identifying a value for the current item count value that meets or exceeds a threshold value, in embodiments.

Figure 3:
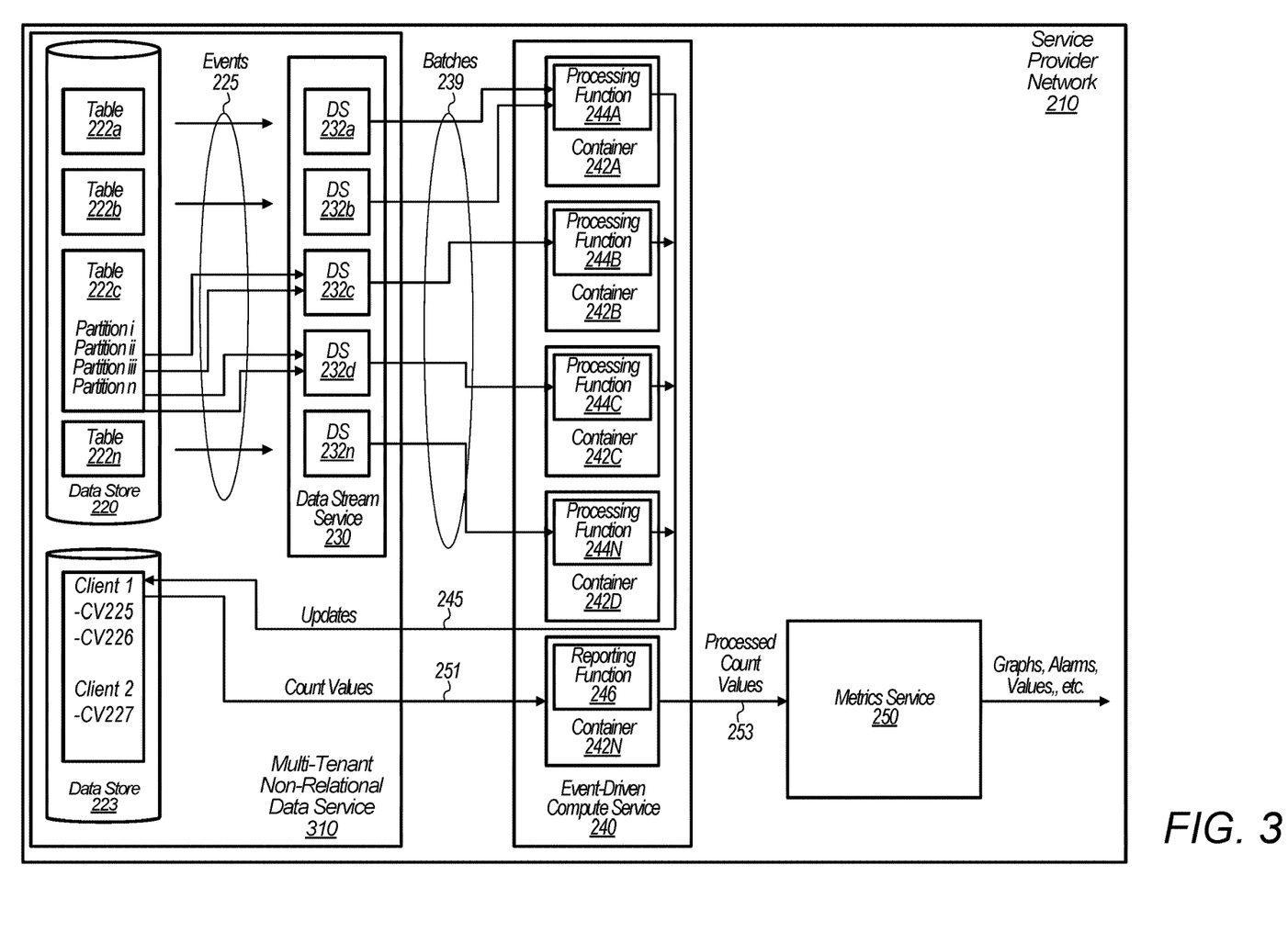
FIG. 3 depicts a data flow through an architecture for implementing a technique for tracking a count of a number of items in a data store, where the architecture includes an event-driven compute service and a multi-tenant non-relational data service, according to at least some embodiments.

FIGS. 1 and 3 illustrate an event-driven compute service fleet 240 of a service provider 210. The event driven compute service fleet 240 includes a fleet of containerized execution environments (242A-N). A number of the containerized execution environments may be implemented by a single host (e.g., a server or a virtual instance), or by multiple hosts, in various embodiments.

Processing functions 244A-N process the events (e.g. singly, or in batches, batch size may be configurable and defined at the event-driven compute service, in embodiments). The system may be configurable such that a processing function has a one-to-one relationship with a table and the item count value for that table, or such that each of a number of processing functions processes events for some subset of partitions of a table and each function updates the same item count value of that table, or such that a single processing function processes events for a number of tables and updates distinct item count values for each of the tables, in embodiments.

In the illustrated embodiment, the processing functions 244A-N execute in respective containers 242A-D of a network-based, multitenant, event-driven computing service 240. The processing functions process the events to identify a net change to the count of items in the table or partition, in embodiments. The processing function may count creates, updates and deletes separately, in embodiments (e.g., to order to report separately).

The processing functions 244A-N update an item count value in a data store based on the net change. The updates 245 may be made to item count values stored in the same database table for which the number of items are being tracked or may be made to item count values that are stored in a data store (e.g., data store 223) distinct from the table for which the number of items are being tracked (as illustrated in FIGS. 1 and 3) or in some other data store entirely. In at least the illustrated embodiment, data store 223 stores count values for various ones of a client's tables. For instance, CV225 and CV226 represent stored item count values for tables 222b and 222c of client 1 and CV227 represents a stored count value for table 222a of client 2, in embodiments.

In the illustrated example, the data store item count service 210 may report the count values (e.g., count values 251 stored in a data store such as data store 224 or some other table) by registering a reporting function (e.g., 246) with the event-driven compute service (e.g., 240), and launching the reporting function in response to a threshold being reached. In some instances, the threshold is a time threshold since the count values were last reported (e.g., periodically). In some embodiments, another characteristic associated with the count values may trigger the reporting function 246. The reporting function may send the processed count values (e.g., 251) to a metrics service (e.g., 250). The metrics service may generate other types of data (e.g., alarms, graphs, or metrics, etc.) and transmit or provide the processed count values 253 other types of data to clients or other entities (e.g., administrative processes of the service provider network 210).

In at least some instances, the execution environment of the event-driven compute service may be constructed to terminate the instance of the processing function or the reporting function upon completion of the instance of the function without saving an execution state for the function.

In at least the illustrated embodiment, the receipt of events, process of events, update of the count values and reporting of the count values may iterate. In at least some embodiments, one or more steps in the illustrated processes may be performed concurrently. For example, one or more of the events being ingested, batches of events processed, and count values updated may be performed concurrently with the launch of and processing by the reporting function (e.g., reporting of a prior count value while the new count value is being determined).

FIG. 3 depicts a data flow through an example architecture for implementing a technique for tracking a count of a number of items in a data store, where the architecture includes an event-driven compute service and a multi-tenant non-relational data service, according to at least some embodiments.

For example, in some embodiments, processing functions (e.g., functions 244A-N) may subscribe to database tables (or associated streams) of a multi-tenant non-relational data service (e.g., 310) that provides events (e.g., create, read, update, and/or delete events) for a particular table. FIG. 3 illustrates that a multi-tenant non-relational data service 310 may provide a data stream service 230 that is already integrated with the multi-tenant non-relational data service 310. FIG. 1 illustrates that the data stream service may be separate from the data store service. In some embodiments, the data stream service may be provided by another service provider entirely. A data store item count system similar to that illustrated in FIG. 1 may include similar components illustrated in FIG. 3, in embodiments.

FIG. 4 illustrates a process diagram that depict a particular technique for tracking a count of a number of items in a database, according to at least some embodiments. The illustrated steps may be performed by one or more of the illustrated components in FIGS. 1, 3, 6 and/or 7, in embodiments.

In FIG. 4, a table item tracking function is registered with an event-driven compute service (block 402). For example, a table item tracking function may be registered with the event-driven compute service 240 of service provider 210. At block 404, one or more tables (e.g., tables 222a-n) of a database service are scanned to determine an initial value for an item count value for each table, and the initial value is stored as the item count value for each respective table. This step is not always necessary. The step may be performed periodically (e.g., to ensure validity) or whenever invalidity is suspected (e.g., based on an alarm)

Block 406 illustrates subscription to a data stream for each of a number of partitions of a table, wherein respective data streams record ADD and REMOVE events (events that add or remove items from a table) for respective partitions of the table provided by a database service of a service provider. For instance, a client may register a function with an event-driven compute service (e.g., 240) and configure the event-driven compute service to subscribe to a data stream associated with the function. The event-driven compute service may receive indications of events received by the stream via the subscription, in embodiments.

A threshold condition for any one of the data streams is detected (block 408). For instance, the event-driven compute service 240 may compare the number of events received by the data stream to a threshold (e.g., a particular batch size) or may use some sort of time-based threshold, or combination thereof to determine that an associated function is to be launched on a container (e.g., 242). If a threshold has not been reached, the event-driven compute service may continue monitoring for the threshold condition (e.g., decision diamond 408, no). Otherwise, the process may continue.

Block 410 illustrates that when a threshold condition is met, a table item tracking function is launched in a respective event-driven compute service container for the data stream that met the threshold condition. In embodiments, the launched tracking processing function obtains a batch of events for the respective partition of the table from a respective data stream, batch processes the events to identify a net change to a count of items in the partition, and performs an atomic update to an item count value based on the net change. In some embodiments, at least because the illustrated process may iterate (e.g., blocks 408, 410, 412 may iterate) for multiple distinct partitions and because multiple tracking functions may execute concurrently, there are opportunities for two or more tracking functions to attempt to concurrently update the same item tracking count for the table associated with the partitions. Atomic updates (e.g., a conditional write or some other type of concurrency control technique may be implemented, in embodiments.

At block 412, the table item tracking function retires without saving an execution state at the function host. In at least the illustrated embodiment, the process may return to decision diamond 408 and wait to detect a threshold condition for one of the data streams, and so on.

FIG. 5 is a process diagram that illustrates a technique for reporting the count of the number of items in a database, according to at least some embodiments. In some embodiments, some of the steps may be performed by various different components or functions. For example, steps 502-510 may be performed by the event-driven compute service 240 (or by functions executing in a containerized environment of the event-driven compute service). In some embodiments, step 512 may be performed by a distinct function (e.g., another function executing in a containerized environment of the event-driven compute service). While many of the illustrated steps in the process diagrams of FIGS. 2, 4 and 5 are not necessary in all embodiments, at least steps 512, 514, 516, and 518 of FIG. 5 are optional steps, not necessarily included in all embodiments and may be performed by yet another function or by a metrics service (e.g., 250) of a service provider (e.g., 210).

A reporting function may or may not be triggered (block 502). For instance, a reporting function, may be registered with the event-driven compute service 240 and the compute service may be configured to trigger the reporting function based on some criteria (e.g., a time-based threshold, or a threshold number of times that an item count value has been updated, etc.). If not triggered, the process may wait until a threshold is met (block 502, no). If triggered (block 502, yes) the reporting function is launched in the event-driven compute service (block 504) and accesses the stored item count values (block 506). For instance, reporting function 246 in FIGS. 1 and 3 may be launched in event-driven compute service 240 and may access stored item count values for one or more tables or partitions (e.g., tables 222a-222n, partitions i-n).

The item count values may be transmitted (and processed, in some embodiments) by the reporting function to a metrics service (block 508), and the reporting function may be retired without saving an execution state at the function host (block 510). Processing may include formatting, aggregation, or the like, in embodiments.

In some embodiments, one or more of optional steps 512-518 may be performed. In some embodiments, the process may return to block 502 and repeat after performing one or more of steps 512-518. For instance, a metrics service (e.g., 250) may update an item count value graph depicting the item count value over time (block 512) and the process may then return to block 502 and repeat (not illustrated). Block 514 illustrates that the value of an item count value may trigger an alarm at the metrics reporting service (e.g., alarms may be configured by clients or customers via an interface to the metrics service, in embodiments). If an alarm is not triggered (block 514, no), the process may return to block 502 and repeat. If an alarm is triggered (block 514, yes) the metrics service may transmit an indication of the alarm (block 516). For instance, the indication of the alarm may be received by the event-driven compute service 240 and may trigger launch of a scanning function process to operate on the table associated with the alarm (block 518). The scanning function may launch in a container 242 of the event-driven compute service, in embodiments.

Figure 6:
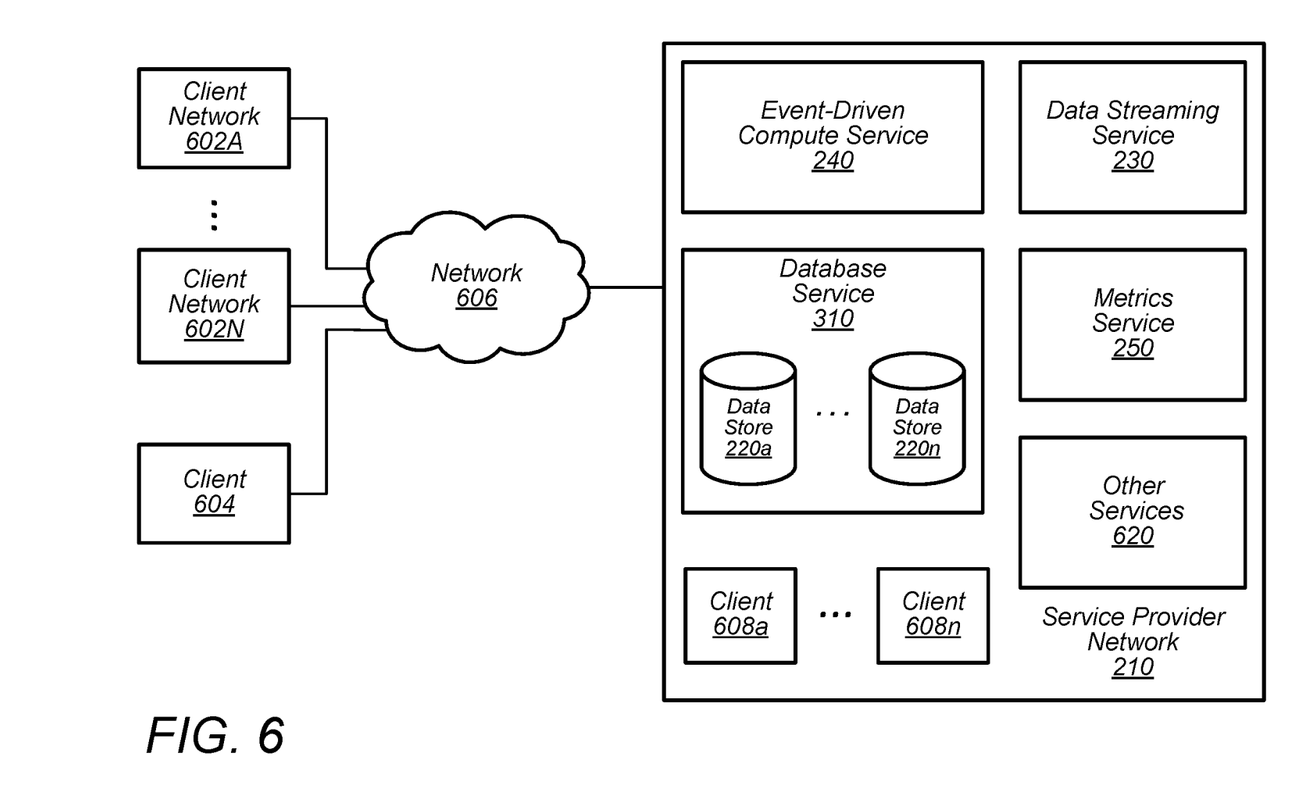
FIG. 6 is a system diagram depicting a service provider network in relation to a number of distinct clients of the services provided by the service provider via the service provider network, according to at least some embodiments.

FIG. 6 is a system diagram depicting a service provider network that may implement a data store item count system (e.g., 212), in embodiments. The illustration depicts the service provider network in relation to a number of distinct clients that obtain services provided by the service provider via the service provider network, according to at least some embodiments. In embodiments, the provider network 210 depicted in FIG. 6 may be the same type of provider network, and include some or all of the components as other provider networks depicted in FIGS. 1 and 3.

In the depicted embodiment, the provider network 210 includes an event-driven compute service 240. In the depicted embodiment, clients (e.g., 602A-N, 604, 608*a-n*) send requests that cause changes to data stores (in some embodiments, applications may send messages that cause changes to data stores). As shown, the clients 608*a-n* are within the provider network 210. For example, the clients 608 may be software applications running on a compute instance and/or computing device within the provider network 210. In some embodiments, some or all of the clients may be external clients 602A-N, 604 that are located external to the provider network 210. For example, the clients 602/604 may be located at a client's data center or other external location used by a client of the provider network 210.

In embodiments, any of the clients may access one or more data stores (e.g., 222*a-n*) as a data source. A data store may be within the provider network, such as a data store 222*a* of a database service 310 or a data store 222*b* of an object data storage service for example. A data store may be a data store and/or software application external to the provider network, such as an external data source, in embodiments. In embodiments, a data store may be a software application within the provider network 210, such as one or more other services 620. As shown, a network 606 may allow external clients 602A-N, 604 to communicate with the provider network 210 and with each other. The clients may include a client network to connect to network 606, in embodiments.

In embodiments, functions are registered with the service provider and data associated with the function (e.g., function code, identifiers for each function, and/or any other associated information) may be stored in a data storage of the event-driven compute service 240 and/or any other data storage of the provider network 210 (e.g., database service 310 or object data storage service, etc.).

In some embodiments, the function code may be written and/or provided by the provider network 210. In some cases, the function code may be written by the client and provided to the provider network 210. In other embodiments, a portion of the function code is written and/or provided by the provider network 210 and a portion of the function code is written by the client and provided to the provider network 210.

In embodiments, a number of containers (e.g., FIGS. 2/3, 242A-D) are each assigned to the registered function to form a pool of containers for the registered function. A given container may be an execution environment capable of executing the registered function. For example, each container of the pool of containers may include a java virtual machine capable of executing the registered function. In embodiments, each container of the pool of containers may be any other execution environment capable of executing the registered function. In some embodiments, event-driven compute service 240 may include any number of different execution environments that may be used to execute any number of different registered functions.

Illustrative System

Figure 7:
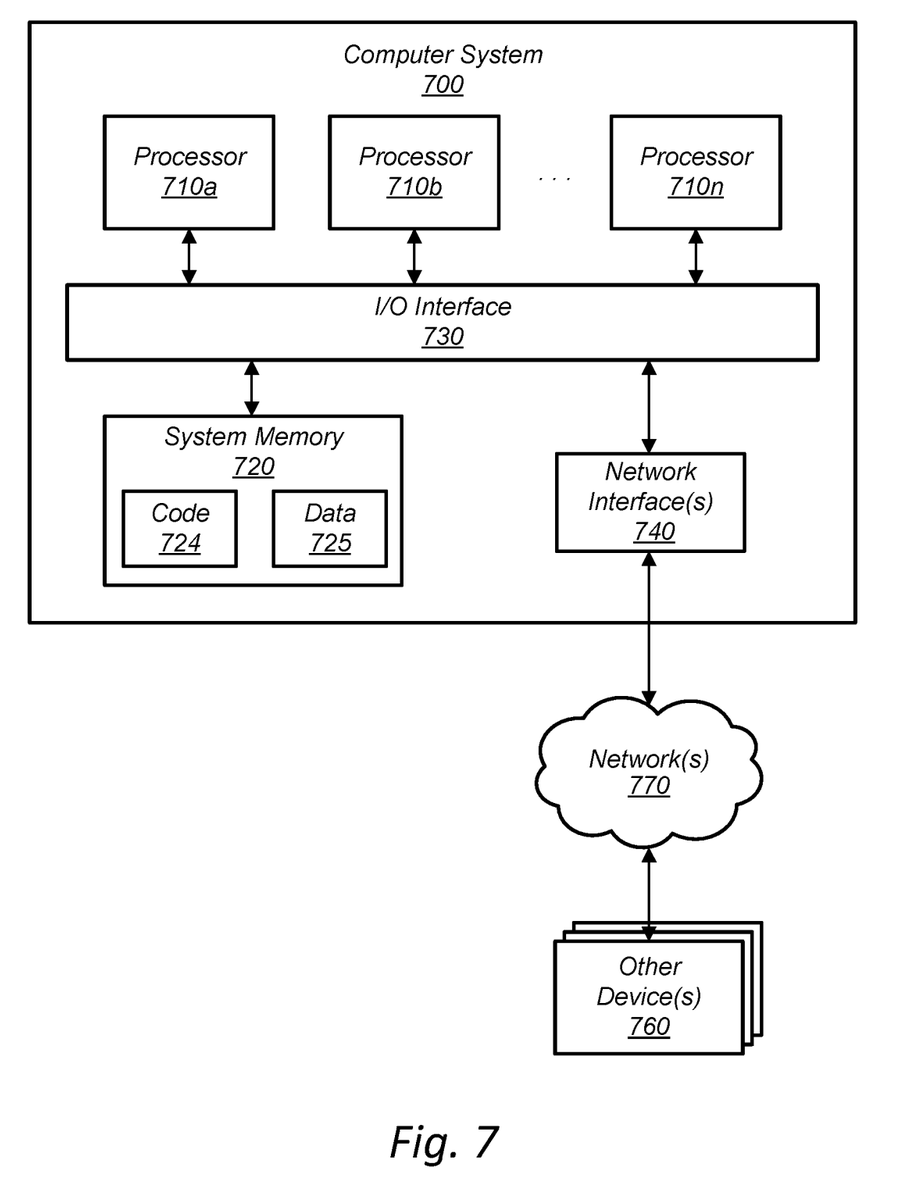
FIG. 7 is a block diagram illustrating an example computer system that may be used in some embodiments.

Any of various computer systems may be configured to implement techniques for tracking a count of a number of items in a data store, as disclosed herein. For example, FIG. 7 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 700 such as that illustrated in FIG. 7 or one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the tracking of a count of a number of items in a data store are shown stored within system memory 720 as program instructions 724. In some embodiments, system memory 720 may include data 725 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as between a client devices (e.g., 760, devices of client 604, devices attached to client networks 602A-602N, clients 608A-608N, etc.) and other computer systems, or among hosts, for example. In particular, network interface 740 may be configured to allow communication between computer system 700 and/or various other device 760 (e.g., I/O devices). Other devices 760 may include scanning devices, display devices, input devices and/or other communication devices, as described herein. Network interface 740 may commonly support one or more wireless networking protocols (e.g., Wi-Fi/IEEE 802.7, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device (e.g., cursor control device, keyboard, or display(s) may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   at least one processor; and
   a memory to store program instructions which, if performed by the at least one processor, cause the at least one processor to:
      receive, via individual ones of multiple data streams, one or more events indicating one or more additions or deletions of items in a partitioned table of a database, wherein different ones of the multiple data streams receive changes for different partitions of the partitioned table, and wherein the database enters events into the data streams indicating changes that have occurred with respect to items in the partitioned table in response to requests from one or more clients for the partitioned table;
      based at least in part on reaching a threshold condition with respect to events collected in a first data stream of the data streams, trigger launch of a first instance of an event-driven function in an event-driven execution environment;
      process, by the first instance of the event-driven function, the one or more events from the first data stream to identify a net change to a count of items in the partitioned table;
      based at least in part on reaching the threshold condition with respect to events collected in a second data stream of the data streams, trigger launch of a second instance of the event-driven function in the event-driven execution environment;
      process, by the second instance of the event-driven function, the one or more events from the second data stream to identify another net change to the count of items in the partitioned table;
      perform, by the first instance of the event-driven function based on the net change identified by the first instance, a first conditional write to an item count value in the database, wherein the item count value is a count of items present in the partitioned table, and wherein the first conditional write is conditioned on the item count value not having been changed by another instance, including the second instance, while the first instance of the event-driven function is updating the item count value;
      perform, by the second instance of the event-driven function, based on the other net change, a second conditional write to the item count value conditioned on the item count value not having been changed by another instance, including the first instance, while the second instance of the event-driven function is updating the item count value; and
      retire, upon completion of the first conditional write, the first instance of the event-driven function from the event-driven execution environment.

2. The system of claim 1, further comprising a reporting function configured to:
   be launched in the event-driven execution environment when a threshold condition is reached;
   access one or more item count values from the database; and
   transmit the one or more item count values to a metrics reporting service.

3. The system of claim 1, further comprising a metrics reporting service configured to:
receive one or more item count values;
generate, based at least in part on the one or more item count values, a count value graph that depicts the item count value over time; and
transmit the count value graph for display.

4. The system of claim 1, wherein each of multiple instances of the event-driven function:
process events for respective sets of the different partitions, and
update, via the first conditional write, the item count value in the database.

5. The system of claim 1,
wherein the one or more events are provided by a non-relational database service that provides the one or more events to the first data stream in a network-based data stream service; and
wherein the event-driven execution environment receives the first data stream from the network-based data stream service.

6. A method, comprising:
triggering, based at least in part on reaching a threshold condition with respect to events collected in a first data stream of multiple data streams, launch of a first instance of an event-driven function in an event-driven execution environment, wherein a database enters events into the data streams indicating changes that have occurred with respect to items in a partitioned table of the database in response to requests from one or more clients for the partitioned table;
processing, by the first instance of the event-driven function, one or more of the events from the first data stream to identify a first net change to a count of items in the partitioned table;
triggering, based at least in part on reaching the threshold condition with respect to events collected in a second data stream, launch of a second instance of the event-driven function in the event-driven execution environment;
processing, by the second instance of the event-driven function, one or more of the events received via the second data stream to identify a second net change to the count of items in the partitioned table;
performing, by the first instance of the event-driven function, a first atomic update, based on the first net change identified by the first instance, to an item count value in a data store, wherein the item count value is a count of items present in the partitioned table, and wherein the first atomic update prevents the item count value from being made invalid by other instances of the event-driven function, including the second instance, while the first instance of the event-driven function is updating the item count value;
performing, by the second instance of the event-driven function, a second atomic update, based on the second net change, to the item count value in the data store, wherein the second atomic update prevents the item count value from being made invalid by other instances of the event-driven function, including the first instance, while the second instance of the event-driven function is updating the item count value; and
terminating, upon completion of the first atomic update, execution of the first instance of the event-driven function in the event-driven execution environment.

7. The method of claim 6, further comprising:
triggering, responsive to a threshold condition being reached, launch of a reporting function in the event-driven execution environment, wherein the reporting function is configured to perform:
accessing one or more item count values from the data store; and
transmitting the one or more item count values to a metrics reporting service.

8. The method of claim 6, further comprising:
triggering, based at least in part on the item count value reaching a threshold, an alarm; and
transmitting an indication of the alarm.

9. The method of claim 6, wherein said terminating execution of the first instance of the event-driven function comprises terminating execution of the first instance of the event-driven function without saving an execution state at a host hosting the first instance of the event-driven function.

10. The method of claim 6, further comprising:
processing, by the first instance of the event-driven function, events for multiple distinct tables; and
updating, by the first instance of the event-driven function, a different item count value for each distinct table.

11. The method of claim 6,
wherein said triggering launch of the first instance of the event-driven function responsive to receiving one or more events comprises:
triggering launch of the first instance of the event-driven function in response to a batch of events;
processing the entire batch to determine the net change to the count of items in the partitioned table; and
updating the item count value based on the net change.

12. The method of claim 6,
wherein the first instance of the event-driven function executes in a network-based, multitenant, event-driven computing service; and
wherein the partitioned table is stored at a network-based, multitenant non-relational database service.

13. A non-transitory computer-readable storage medium, storing program instructions that when executed by one or more computing devices cause the one or more computing devices to perform:
triggering, based at least in part on reaching a threshold condition with respect to events collected in a first data stream of multiple data streams, launch of a first instance of an event-driven function in an event-driven execution environment, wherein a database enters events into the data streams indicating changes that have occurred with respect to items in a partitioned table of the database in response to requests from one or more clients for the partitioned table;
processing, by the first instance of the event-driven function, one or more of the events from the first data stream to identify a net change to a count of items in the partitioned table;
triggering, based at least in part on reaching the threshold condition with respect to events collected in a second data stream, launch of a second instance of the event-driven function in the event-driven execution environment;
processing, by the second instance of the event-driven function, one or more of the events received via the second data stream to identify another net change to the count of items in the partitioned table;
performing, by the first instance of the event-driven function, a first atomic update, based on the net change identified by the first instance, to an item count value in a data store, wherein the item count value is a count of items present in the partitioned table, and wherein the first atomic update prevents the item count value from being made invalid by other instances of the event-driven function, including the second instance, while the first instance of the event-driven function is updating the item count value;

performing, by the second instance of the event-driven function, a second atomic update, based on the other net change, to the item count value in the data store, wherein the second atomic update prevents the item count value from being made invalid by other instances of the event-driven function, including the first instance, while the second instance of the event-driven function is updating the item count value; and retiring, upon completion of the first atomic update, the first instance of the event-driven function from the event-driven execution environment.

14. The non-transitory computer-readable storage medium of claim 13, wherein the program instructions, when executed by the one or more computing devices cause the one or more computing devices to perform said triggering launch of the first instance of the event-driven function in response to meeting a batch size threshold of create and delete events received in a data stream from a non-relational database service.

15. The non-transitory computer-readable storage medium of claim 13, wherein the program instructions, when executed by the one or more computing devices cause the one or more computing devices to perform:

scanning the partitioned table of the database to determine an initial value for the item count value, wherein said performing the first atomic update to the item count value includes performing the first atomic update to the initial value for the item count value.

16. The non-transitory computer-readable storage medium of claim 13, wherein the program instructions, when executed by the one or more computing devices cause the one or more computing devices to perform:

triggering, based at least in part on an alarm from a metrics reporting service, a validation technique for validating a current value for the item count value, wherein determining the alarm comprises:
identifying a negative value for a current item count value, or
identifying a value for the current item count value that meets or exceeds a threshold value.

17. The non-transitory computer-readable storage medium of claim 13, wherein the program instructions, when executed by the one or more computing devices cause the one or more computing devices to perform a validation technique, wherein performing the validation technique includes:

scanning the partitioned table of the database to determine a scanned value for the count of items in the partitioned table;

determining validity of a current value for the item count value based on comparing the scanned value to the current value; and transmitting an indication of the validity of the current value for the item count based on the validity of the current value.

18. The non-transitory computer-readable storage medium of claim 13, wherein the program instructions, when executed by the one or more computing devices cause the one or more computing devices to perform said performing the first atomic update to the item count value in a table distinct from the partitioned table for which the item count value is updated.

19. The non-transitory computer-readable storage medium of claim 13, wherein the program instructions, when executed by the one or more computing devices cause the one or more computing devices to perform said performing the first atomic update subsequent to receipt, via the first data stream, of one or more events that indicate one or more additions or deletions of items in the partitioned table of the database, said performing the first atomic update based on the net change to the item count value in the data store in real-time or in near-real-time with respect to said receipt of the one or more events indicating the one or more additions or deletions of items in the partitioned table of the database.

20. The non-transitory computer-readable storage medium of claim 13, wherein the program instructions, when executed by the one or more computing devices cause the one or more computing devices to perform:

performing said triggering, said processing, and said performing the first atomic update for each of a plurality of distinct tables by the first instance of the event-driven function executing in a container of an event-driven compute service.

\* \* \* \* \*